US005460006A

United States Patent [19]
Torimitsu

[11] Patent Number: 5,460,006
[45] Date of Patent: Oct. 24, 1995

[54] MONITORING SYSTEM FOR FOOD STORAGE DEVICE

[75] Inventor: Hiroshi Torimitsu, Nagoya, Japan

[73] Assignee: Hoshizaki Denki Kabushiki Kaisha, Toyoake, Japan

[21] Appl. No.: 152,502

[22] Filed: Nov. 16, 1993

[51] Int. Cl.⁶ .................................................. F25B 49/00
[52] U.S. Cl. ................... 62/127; 62/130; 236/51; 340/585
[58] Field of Search ............... 62/126, 127, 129, 62/130, 125, 175; 165/11 R, 22; 236/51, 94; 340/585, 870.17, 825.06, 825.07, 825.08, 825.16, 825.17, 825.22, 825.36, 825.37

[56] References Cited

U.S. PATENT DOCUMENTS

| | | | |
|---|---|---|---|
| 4,028,688 | 6/1977 | Goleman | 340/585 X |
| 4,090,248 | 5/1978 | Swanson et al. | 236/DIG. 8 |
| 4,183,223 | 1/1980 | Alsenz | 236/51 X |
| 4,441,329 | 4/1984 | Dawley | 62/127 X |
| 4,482,785 | 11/1984 | Finnegan et al. | 340/585 X |
| 4,555,057 | 11/1985 | Foster | 62/127 X |
| 4,788,647 | 11/1988 | McManus et al. | 340/825.06 |
| 4,811,897 | 3/1989 | Kobayashi et al. | 236/51 X |
| 5,181,389 | 1/1993 | Hanson et al. | 62/127 X |
| 5,279,458 | 1/1994 | Dewolf et al. | 236/51 X |

*Primary Examiner*—Harry B. Tanner
*Attorney, Agent, or Firm*—Nikaido, Marmelstein, Murray & Oram

[57] ABSTRACT

A monitoring system for a plurality of food storage apparatuses each of which includes a food storage cabinet for storing foodstuffs therein, a cooling device for cooling the interior of the storage cabinet, a setting device for determining a temperature condition of the storage cabinet, a detection device for detecting an internal temperature of the storage cabinet and control means for applying a control signal based on the predetermined temperature and the detected internal temperature to the cooling device for controlling operation of the cooling device in such a manner that the storage cabinet is maintained at the predetermined temperature, wherein the food storage apparatuses each are provided with output means for issuing electric signals respectively indicative of the predeteremined temperature condition and the detected internal temperature outwardly, and wherein the monitoring system includes a signal receiver for monitoring each operating condition of the food storage apparatuses on a basis of the electric signals applied thereto from the respective output means.

7 Claims, 5 Drawing Sheets

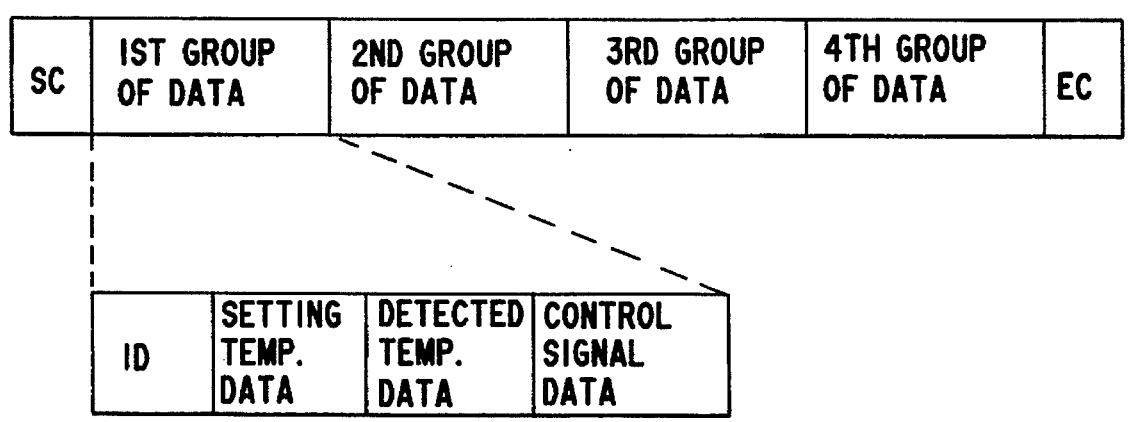

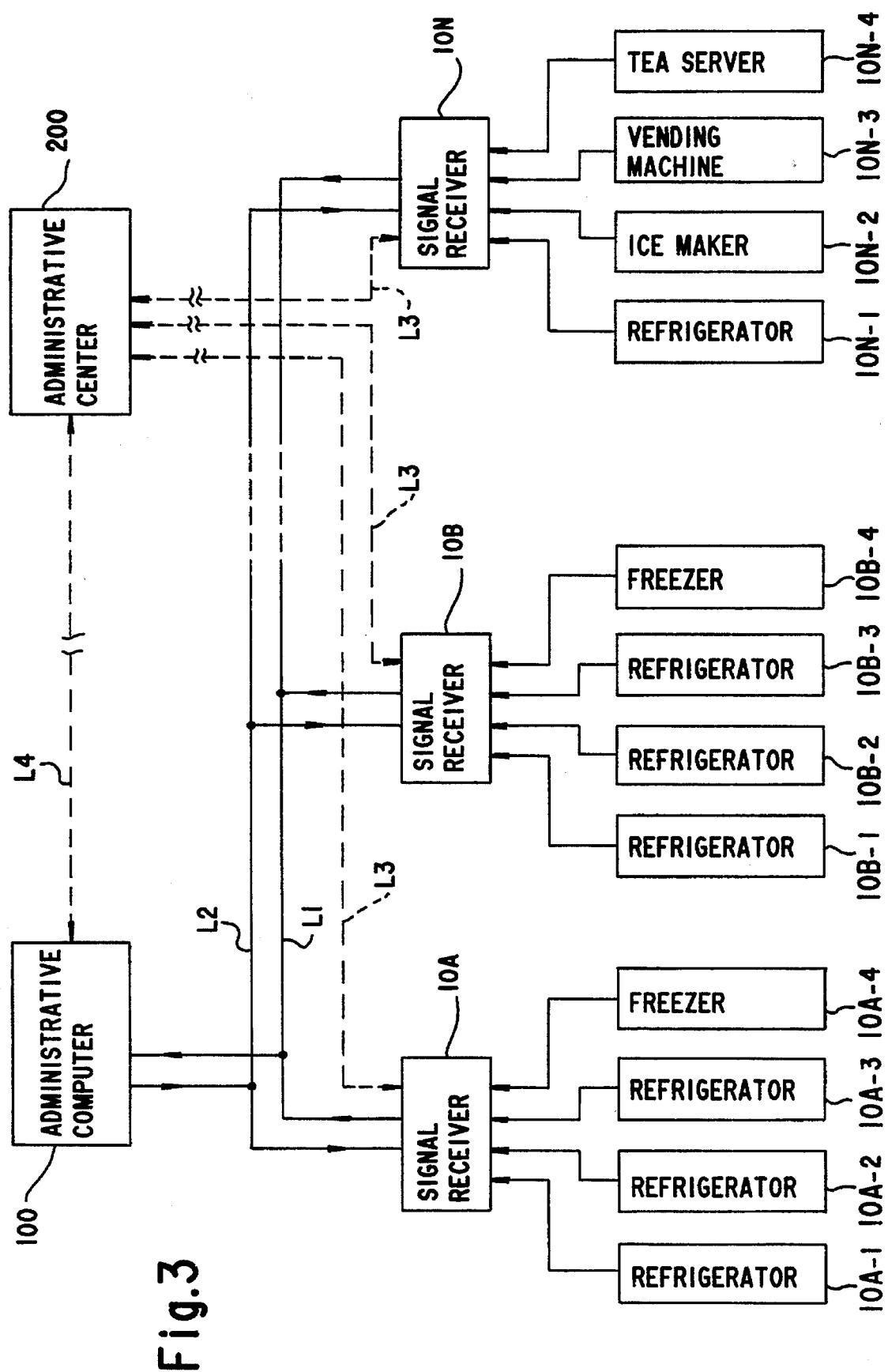

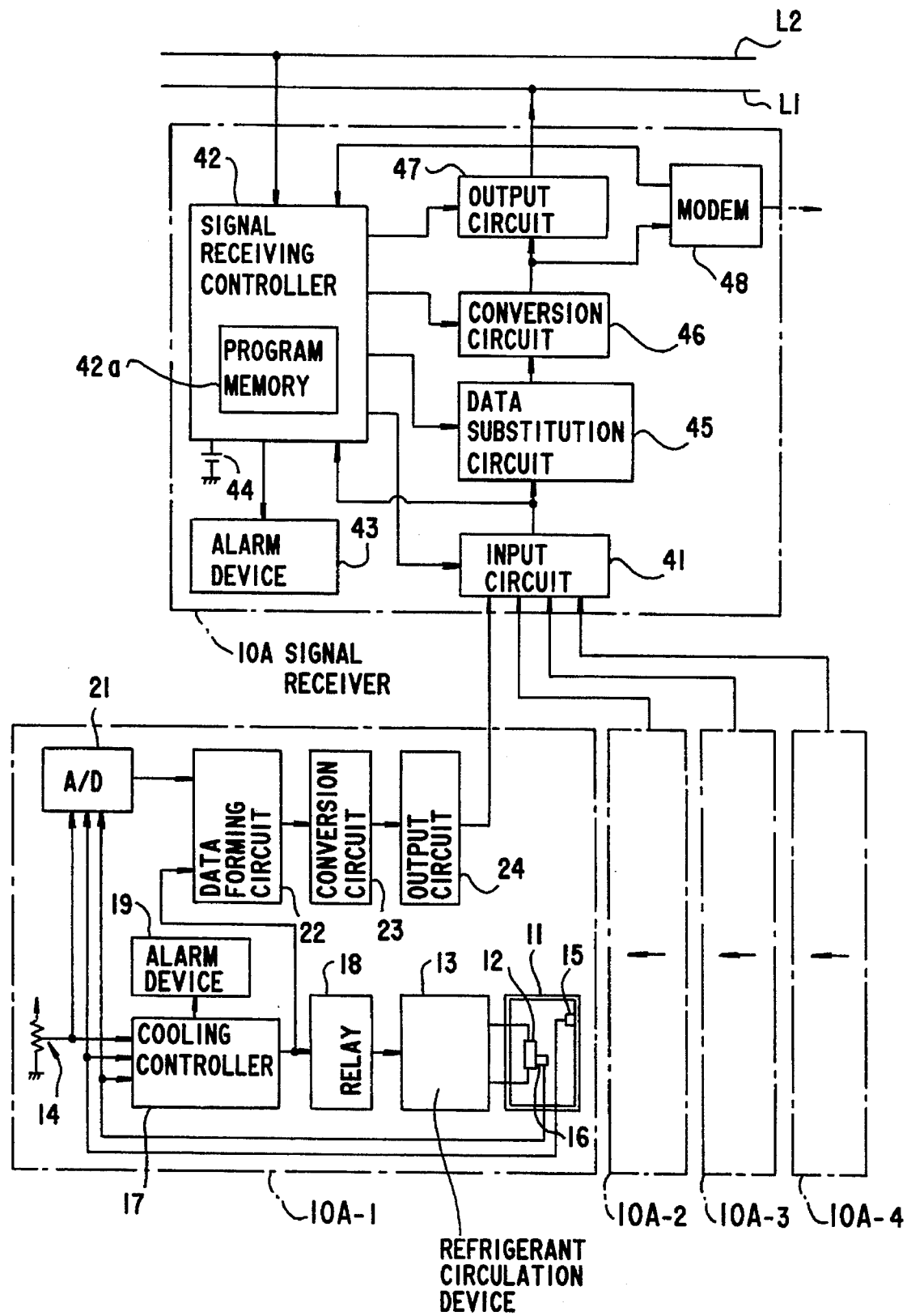

MONITORING SYSTEM FOR FOOD STORAGE DEVICE

BACKGROUND OF THE INVENTION

1. Field of the Invention

The present invention relates to a monitoring system for remotely monitoring food storage apparatuses such as a refrigerator, a freezer and the like for storing foodstuffs at a predetermined temperature.

2. Description of the Prior Art

For inspection abnormality in operation of a number of food storage apparatuses installed in a hotel, a big store or the like, the food storage apparatuses must be inspected one by one, resulting in trouble for the user and an error in finding abnormality of the respective food storage apparatuses. Since there will occur abnormality in operation of the food storage apparatuses at night, it is necessary to place some person for inspecting the respective food storage apparatuses in the night.

SUMMARY OF THE INVENTION

It is, therefore, a primary object of the present invention to provide a monitoring system for a plurality of food storage apparatuses capable of remotely monitoring each operating condition of the food storage apparatuses without any error in finding abnormality of the respective food storage apparatuses.

According to the present invention, the object is accomplished by providing a monitoring system for a plurality of food storage apparatuses each of which includes a food storage cabinet for storing foodstuffs therein, a cooling device for cooling the interior of the storage cabinet, a setting device for preliminarily determining a temperature condition of the storage cabinet, a detection device for detecting an internal temperature of the storage cabinet and control means for applying a control signal based on the predetermined temperature condition and the detected internal temperature to the cooling device for controlling operation of the cooling device in such a manner that the storage cabinet is maintained at the predetermined temperature, wherein the food storage apparatuses each are provided with output means for issuing electric signals respectively indicative of the predetermined temperature condition and the detected internal temperature outwardly, and wherein the monitoring system comprises a signal receiver for monitoring operating condition of the respective food storage apparatuses on a basis of the electric signals applied thereto from the respective output means.

In a practical embodiment of the present invention, it is preferable that the output means each are arranged to apply the control signal from the control means to the signal receiver such that each operating condition of the food storage apparatuses is monitored by the signal receiver on a basis of the control signal applied thereto in addition to the electric signals from the output means. With such an arrangement, the operating condition of the respective food storage apparatuses can be monitored in a more reliable manner.

It is further preferable that the signal receiver is in the form of a microcomputer backed up by a battery. With such an arrangement, the monitor of the food storage apparatuses can be conducted even if the power supply is suspended at the installation place of the signal receiver. It is also preferable that a plurality of the signal receivers each are connected to an administrative computer to be administrated by the administrative computer. With this arrangement, each operating condition of the plural food storage apparatuses and each condition of the signal receivers can be monitored by an operator under observation of the administrative computer.

It is further preferable that the signal receivers each are comprised of a microcomputer arranged to be applied with a control program from the administrative computer. In this case, even if the food storage apparatuses connected to the signal receivers are replaced with other food storage apparatuses, each function of the signal receivers can be adjusted in accordance with the replaced food storage apparatuses by an instruction from the administrative computer. Thus, the signal receivers can be utilized in common without replacement of their components and adjustment thereof.

Furthermore, the signal receivers each may be provided with signal transmit-receive means for receiving the electric signals from the food storage apparatuses through a telephone line and for transmitting the electric signals to an external device therefrom through the telephone line. In this case, the operating condition of the respective food storage apparatuses can be remotely monitored by the electric signals applied through the telephone line at a place apart from the signal receivers.

BRIEF DESCRIPTION OF THE DRAWINGS

Other objects, features and advantages of the present invention will be more readily appreciated from the following detailed description of preferred embodiments thereof when taken together with the accompanying drawings, in which:

FIG. 2 is a format of data transmitted to a signal receiver from the respective food storage apparatuses shown in FIG. 1;

FIG. 3 is a block diagram of a second embodiment of a monitoring system for a plurality of food storage apparatuses in accordance with the present invention;

FIG. 4 is a detailed block diagram of one of signal receivers and food storage apparatuses shown in FIG. 3;

FIG. 5 is a format of data transmitted to an administrative computer from the signal receivers shown in FIGS. 3 and 4.

DESCRIPTION OF THE PREFERRED EMBODIMENTS

Figure 1:
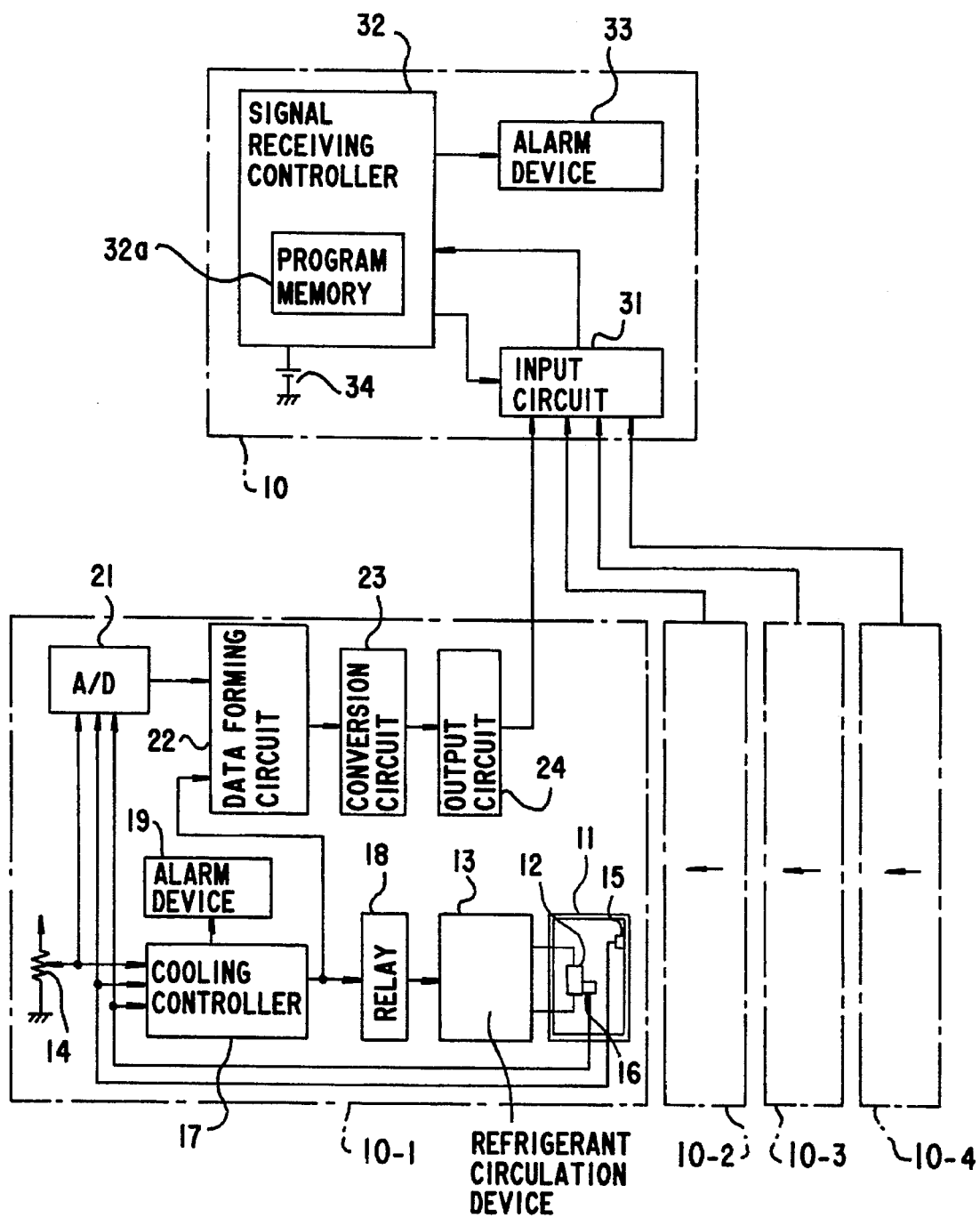
FIG. 1 is a block diagram of a first embodiment of a monitoring system for a plurality of food storage apparatuses in accordance with the present invention.

Hereinafter, a first embodiment of the present invention will be described with reference to the drawings. In FIG. 1 there is illustrated a monitoring system for food storage apparatuses such as refrigerators, freezers and the like. The monitoring system includes a signal receiver 10 connected to four sets of food storage apparatuses 10-1 to 10-4 which are installed in respective rooms of a hotel or plural places in a big store. The signal receiver 10 is installed in an administrative room of the hotel or the store.

The food storage apparatuses 10-1 to 10-4 each include a cooler or an evaporator 12 disposed within a storage cabinet 11 and a refrigerant circulation device 13 connected to the cooling device 12 as well as in a refrigerator or a freezer. The refrigerant circulation device 13 includes an electric compressor, a condenser and a throttle which cooperate with the evaporator 12 to cool the interior of the storage cabinet 11. In operation of the compressor, refrigerant is supplied to the evaporator 12 through the condenser and throttle and recirculated into the compressor from the evaporator. The refrigerant circulation device 13 further includes a hot gas valve which is disposed within a bypass line of the condenser and throttle to supply hot gas from the compressor into the evaporator therethrough. When the hot gas valve is opened, the hot gas is supplied into the evaporator 12 to eliminate frost adhered to the evaporator 12.

For control of the refrigerant circulation device 13, the food storage apparatuses 10-1 to 10-4 each are provided with a setting device 14 mounted on an operation panel for preliminarily determining a desired temperature condition, a storage temperature sensor 15 disposed within the storage cabinet 11, a cooling temperature sensor 16 attached to the evaporator 12, a cooling controller 17 in the form of a microcomputer and a group of relay circuits 18 for controlling the compressor and hot gas valve of the refrigerant circulation device 13.

When the setting device 14 is operated by the user to preliminarily determine a desired internal temperature of the storage cabinet, the cooling controller 17 is applied with an input signal indicative of the predeteremined internal temperature. Thus, the cooling controller 17 compares the predetermined internal temperature with an actual internal temperature detected by the storage temperature sensor 15 to control operation of the compressor on a basis of a resultant of the comparison. Under control of the cooling controller 17, the refrigerant circulation device 13 is operated to control supply of the refrigerant to the evaporator 12 for maintaining the internal temperature of the storage cabinet at the predetermined temperature. As the method of setting an internal temperature of the storage cabinet, there is a method of determining an average temperature or an upper limit temperature of the storage cabinet or a method of determining upper and lower limit temperatures of the storage cabinet. With these methods, the internal temperature of the storage cabinet 11 will be maintained at the average temperature or below the upper limit temperature or between the upper and lower limit temperatures.

In addition to control of the internal temperature of the storage cabinet 11, the cooling controller 17 is designed to control defrost of the evaporator 12 and to monitor operating condition of the refrigerant circulation device 13. In control of defrost of the evaporator 12, the cooling controller 17 controls the energized condition of the hot gas valve in the refrigerant circulation device 13 through the group of relay circuits 18 at a predetermined time interval for supplying the hot gas into the evaporator 12 from the compressor. Thereafter, the cooling controller 17 deactivates the hot gag valve when the temperature detected by the temperature sensor 16 becomes a predetermined temperature.

In monitor of the refrigerant circulation device 13, the cooling controller 17 monitors the evaporator 12 and the refrigerant circulation device 13 on a basis of the temperatures respectively determined by the setting device 14 and detected by the storage temperature sensor 15 and cooling temperature sensor 16 and applies an error signal to an alarm device 19 when detected abnormality of the evaporator 12 or the refrigerant circulation device 13. The alarm device 19 is in the form of an indicator or a buzzer arranged to visually or acoustically inform the operator of the detected abnormality.

The food storage apparatuses 10-1 to 10-4 each are provided with an external interface composed of an analog to digital or A/D converter 21, a data forming circuit 22, a parallel-serial conversion circuit 23 and an output circuit 24. The A/D converter 21 is connected to the setting device 14 and temperature sensors 15, 16 to convert analog signals from the setting device 14 and sensors 15, 16 into the corresponding digital signals for applying them to the data forming circuit 22. The data forming circuit 22 is connected to the A/D converter 21 and cooling controller 17 to temporarily memorize the digital signals and control signal respectively applied from the A/D converter 21 and cooling controller 17. The data forming circuit 22 is designed to add the input data to a start code SC, an identity data ID and an end code ED for forming a set of data and applying it to the parallel-serial conversion circuit 23. The parallel-serial conversion circuit 23 is designed to convert the set of data in parallel-serial, and the output circuit 24 is arranged to apply the set of converted data to the signal receiver 10 in a serial format.

In FIG. 2 there is illustrated the serial format of the set of converted data, wherein the start code SC represents a leading position of the set of converted data, the identity data ID represents an indentity number for indentifying each mode name or type of the food storage apparatuses 10-1 to 10-4, the setting data represents the temperature determined by the setting device 14, the detected temperature data represents each temperature detected by the temperature sensors 15, 16, the control signal data corresponds with a control signal applied from the cooling controller 17, and the end code EC represents a trailing end of the set of converted data.

The signal receiver 10 is in the form of a microcomputer which includes an input circuit 31, a signal receiving controller 32 and an alarm device 33. The signal receiving controller 32 is connected to a battery 34 to back up the signal receiver 10 for activation thereof in an occurrence of suspension of the electric power. The input circuit 31 is applied with four sets of serial data from the food storage apparatuses 10-1 to 10-4 under control of the signal receiving controller 32 and to convert the four sets of serial data respectively into parallel data for supplying the converted parallel data to the signal receiving controller 32. The signal receiving controller 32 is in the form of a microcomputer which is provided with a program memory 32a for memorizing a program for monitoring operating condition of the respective food storage apparatuses 10-1 to 10-4 and for detecting abnormality in operation of the respective food storage apparatuses. The alarm device 33 is provided with indicators for the respective food storage apparatuses 10-1 to 10-4 and a common buzzer for all the food storage apparatuses, wherein the indicators and buzzer are controlled by the signal receiving controller 32 to visually and acoustically inform the operator of abnormality in operation of the respective food storage apparatuses.

In operation of the signal receiver 10, the signal receiving controller 32 executes the memorized program to read out the four sets of converted parallel data respectively defined by the start code SC and end code EC through the input circuit 31. Based on the four sets of converted parallel data, the signal receiving controller 32 detects abnormality in operation of the respective food storage apparatuses 10-1 to 10-4 under the following conditions and activates the alarm device 33 to inform the operator of the food storage apparatus operated in an abnormal condition.

1) To determine the food storage apparatus as being operated in an abnormal condition if the detected temperature data become abnormal in relation to the predetermined temperature data in the food storage apparatus identified by the identity data.

2) To determine the food storage apparatus as being operated in an abnormal condition if the control signal data become abnormal in the food storage apparatus identified by the indentity data.

3) To determine the food storage apparatus as being operated in an abnormal condition if a resultant of relative comprison of the predetermined temperature data, the detected temperature data and the control signal data becomes abnormal in the food storage apparatus identified by the indentity data.

As described above, the signal receiving controller 32 is activated to monitor operating condition of the food storage apparatuses 10-1 to 10-4 for detecting an occurrence of abnormality in operation thereof. In the occurrence of abnormality, the alarm device 33 is activated to inform the operator of the food storage apparatus identified by the identity data ID. Thus, the operating condition of all the food storage apparatuses 10-1 to 10-4 can be monitored by an operator under observation of the alarm device 33 to avoid trouble caused by abnormality in operation of the respective food storage apparatuses and to prevent change of the quality of foodstuffs stored in the respective storage cabinets 11. Since the signal receiver 10 is backed up by the battery 34, the monitor of the food storage apparatuses can be conducted even if the power supply is suspended at the installation place of the signal receiver 10.

Second Embodiment

In FIG. 3 there is illustrated a second embodiment of a monitoring system for food storage apparatuses according to the present invention, which monitoring system is constructed in a larger scale for application to a big store or department store. The monitoring system of the second embodiment is provided with a plurality of signal receivers 10A, 10B, ... 10N each in the form of a microcomputer. The signal receiver 10A is connected to refrigerators 10A-1, 10A-2 and to freezers 10A-3, 10A-4. The signal receiver 10B is connected to refrigerators 10B-1 to 10B-3 and to a freezer 10B-4. In this case, the refrigerators 10A-1, 10A-2, 10B-1 to 10B-3 and the freezers 10A-3, 10A-4, 10B-4 are designed substantially the same in construction as those in the first embodiment as shown in FIG. 4. The signal receiver 10N is connected to a refrigerator 10N-1, an ice maker 10N-2, a vending machine 10N-3 and a tea server 10N-4 to monitor the respective machines 10N-1 to 10N-4 on a basis of input signal data applied therefrom.

As shown in FIGS. 3 and 4, the signal receivers 10A to 10N each include an input circuit 41, a signal receiving controller 42, an alarm device 43 and a battery 44 which are substantially the same in construction and function as those in the first embodiment. The signal receivers 10A to 10N each are provided with a data substitution circuit 45, a parallel-serial conversion circuit 46 and an output circuit 47 which are controlled by the signal receiving controller 42 to issue input data applied from the respective food storage apparatuses outwardly.

The data substitution circuit 45 is designed to substitute the four sets of data converted in parallel at the input circuit 41 for a set of data and to apply the substituted set of data to the parallel-serial conversion circuit 46. In substitution of the four sets of data, as shown in FIG. 5, the respective sets of converted parallel data except for the start code and end code thereof are aligned and allotted with the start code SC and end code EC at their leading and trailing ends. The paralle-serial conversion circuit 46 is arranged to convert the substituted set of data into a serial data and to apply the converted serial data to the output circuit 47.

The respective output circuits 47 of the signal receivers 10A, 10B, ... 10N are connected to an administrative computer 100 through a signal line $L_1$ to supply the converted serial data from the parallel-serial conversion circuit thereto. The administrative computer 100 is substantially the same in construction and function as the signal receivers 10A, 10B, ... 10N but larger in scale than the signal receivers to be installed in a big store or department store. The administrative computer 100 is also connected to the respective signal receiving controllers 42 of signal receivers 10A, 10B, ... 10N through a signal line $L_2$ to supply a control signal therefrom to the respective signal receiving controllers 42. Assuming that one of the signal receivers 10A, 10B, ... 10N has been designated by the administrative computer 100, the signal receiving controller 42 of the designated signal receiver is activated to apply input data from the corresponding refrigerator or freezer to the administrative computer 100 through the output circuit 47 for monitoring the refrigerator or freezer. If there occurs abnormality in operation of either one of the designated refrigerators or freezers, the administrative computer 100 acts to indicate the abnormality on an appropriate display device substantially in the same manner as in the signal receiver of the first embodiment. Thus, operation of all the refrigerators, freezers and the like can be monitored at one place.

In the second embodiment, the program memory 42a of the respective signal receiving controllers 42 is in the form of a random access memory or RAM which is arranged to store a control program applied from the administrative computer 100. In this ease, the administrative computer 100 indentifies the respective mode names or types of the refrigerators and freezers on a basis of the identity data ID of the input data supplied from the signal receivers 10A, 10B, ... 10N and causes the program memory 42a to store each control program suitable for the refrigerators and freezers through the signal line $L_2$. Accordingly, even if the refrigerators and freezers connected to the signal receivers 10A, 10B, ... 10N were replaced with other refrigerators or freezers of different models or types, each function of the signal receivers 10A, 10B, ... 10N could be adjusted in accordance with the replaced refrigerators or freezers by storing the control programs in the program memory 42a. Thus, the signal receivers 10A, 10B, ... 10N can be utilized in common without replacement of their components.

As shown in FIG. 4, the signal receivers 10A, 10B, ... 10N each are further provided with a modem 48 which is arranged to connect the signal receivers 10A, 10B, ... 10N to an external device such as an administrative computer in an administrative center 200 by way of telephone wires $L_3$. In addition, the administrative computer in the administrative center 200 is substantially the same in function as the administrative computer 100 but larger in scale. The modem 48 of the respective signal receivers 10A, 10B, ... 10N is connected to the parallel-serial conversion circuit 46 and the signal receiving controller 42 so that the administrative computer in the administrative center 200 is applied with input data (see FIG. 5) from the signal receivers 10A, 10B, ... 10N to monitor operating condition of the refrigerators and freezers. Additionally, the adminstrative computer in the administrativ center 200 may be arranged to store the control programs in the respective program memories 42a of signal receiving controllers 42 through the modem 48. In such an arrangement, the signal receivers 10A, 10B, ... 10N can be remotely controlled at the administrative center 200 to monitor and adminstrate the refrigerators and freezers.

In the second embodiment, the administrative computer 100 may be also connected to the administrative computer in the administrative center 200 by way of a telephone wire $L_4$ so that the administrative computer 100 can be monitored and administrated at the administrative center 200.

Third Embodiment

Figure 6:
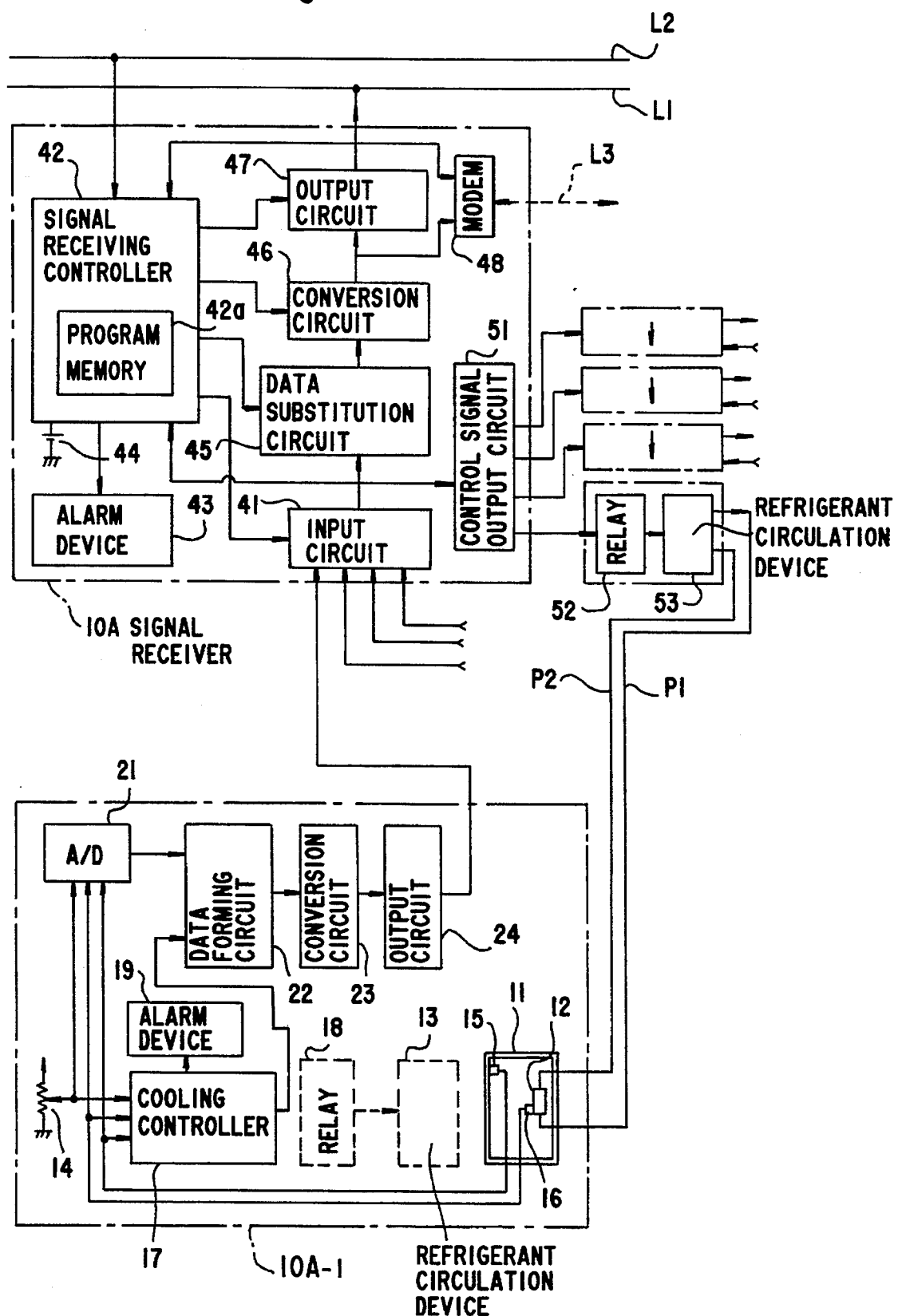
FIG. 6 is a block diagram of a third embodiment of a monitoring system for a plurality of food storage apparatuses in accordance with the present invention.

In FIG. 6 there is illustrated a third embodiment of a monitoring system for food storage apparatuses according to the present invention, wherein the signal receiver 10A is provided with a control signal output circuit 51 in addition to the compoments of the second embodiment. The control signal output circuit 51 is designed to extract only a control signal data from input data applied from the refrigerators 10A-1, 10A-2 and freezers 10A-3, 10A-4 at the input circuit 41 and to apply the control signal data to a refrigerant circulation device 53 through a group of relay circuits 52 in the same manner as the output signal of the cooling controller 17 in the respective refrigerators 10A-1, 10A-2 and freezers 10A-3, 10A-4. In this ease, the group of relay circuits 52 and refrigerant circulation device 53 are designed substantially in the same construction as the group of relay circuits 18 and refrigerant circulation device 13 in the first and second embodiments, provided that the group of relay circuits 52 and refrigerant circulation device 53 are installed outside of the rooms, in which the refrigerators 10A-1, 10A-2 and freezers 10A-3, 10A-4 are installed, and connected to the evaporator 12 in the respective storage cabinets through pipes $P_1$, $P_2$. In this embodiment, it is not necessary to provide the group of relay circuits 18 and refrigerant circulation device 13 in the respective refrigerators 10A-1, 10A-2 and freezers 10A-3, 10A-4.

In the third embodiment, the refrigerators 10A-1, 10A-2 and freezers 10A-3, 10A-4 are monitored by the signal recevier 10A in the same manner as in the second embodiment. Since the refrigerant circulation device 53 is arranged apart from the the storage cabinet 11, the ambient temperature of the storage cabinet 11 does not rise without any influence caused by heat generation of the refrigerant circulation device 53. Thus, the cooling efficiency of evaporator 12 is enhanced, and noise problems of the refrigerant circulation device 53 can be avoided. Furthermore, since the control signal applied to the signal receiver 10A from the cooling controller 17 is adapted to monitor the refrigerators 10A-1, 10A-2 and freezers 10A-3, 10A-4, the foregoing advantages can be realized in a simple manner.

What is claimed is:

1. A monitoring system for a plurality of food storage apparatuses each of which includes a food storage cabinet for storing foodstuffs therein, a cooling device for cooling the interior of the storage cabinet, a manual setting device for preliminarily determining a desired temperature of the storage cabinet, a detection device for detecting an internal temperature of the storage cabinet and control means for applying a control signal based on the desired temperature and the detected internal temperature to the cooling device for controlling operation of the cooling device in such a manner that the interior of the storage cabinet is maintained at the desired temperature, wherein the food storage apparatuses each are provided with output means for issuing electric signals respectively indicative of the desired temperature, the detected internal temperature and an identity member for identifying each type of the food storage apparatuses outwardly, and wherein the monitoring system comprises a signal receiver for monitoring each operating condition of the food storage apparatuses on a basis of the electric signals applied thereto from said output means, said signal receiver including means responsive to the electric signals for determining each of the food storage apparatuses as being operated in an abnormal condition if the detected temperature becomes abnormal in relation to the desired temperature in the food storage apparatus identified by the identity number and alarm means for informing an operator of the abnormality in operation of the food storage apparatus identified by the identity number.

2. A monitor system as set forth in claim 1, wherein each output means each is arranged to apply the control signal from said control means to said signal receiver such that said signal receiver is applied with the control signal in addition to the electric signals respectively indicative of the desired temperature, the detected internal temperature and the identity number, and wherein said signal receiver further includes means responsive to the electric signals and the control signal for determining each of said food storage apparatuses as being operated in an abnormal condition if the control signal becomes abnormal in comparison with the desired temperature and the detected temperature in said food storage apparatus identified by the identity number.

3. A monitoring system as set forth in claim 1, wherein the signal receiver is in the form of a microcomputer which is backed up by a battery.

4. A monitoring system as set forth in claim 1, wherein a plurality of the signal receivers each are connected to an administrative computer to be administrated by the administrative computer.

5. A monitoring system as set forth in claim 4, wherein the signal receivers each are comprised of a microcomputer arranged to be applied with a control program from the administrative computer.

6. A monitoring system as set forth in claim 1, wherein the signal receiver is provided with signal transmit-receive means for receiving the electric signals from the food storage apparatuses through a telephone line and for transmitting the electric signals to an external device therefrom through the telephone line.

7. A monitoring system as set forth in claim 6, wherein the signal receiver is in the form of a microcomputer which is applied with a control program from the external device through the telephone line by means of the transmit-receive means.

* * * * *